US006364653B1

(12) United States Patent
Sirois

(10) Patent No.: US 6,364,653 B1
(45) Date of Patent: Apr. 2, 2002

(54) EDGE ROLLING DEVICE FOR DOUGH PIECES

(75) Inventor: Gaby Sirois, St-Georges (CA)

(73) Assignee: Matiss Inc., St. Georges Quebec (CA)

( * ) Notice: Subject to any disclaimer, the term of this patent is extended or adjusted under 35 U.S.C. 154(b) by 0 days.

(21) Appl. No.: 09/260,533

(22) Filed: Feb. 26, 1999

(30) Foreign Application Priority Data

Feb. 27, 1998 (CA) ............................................. 2228096

(51) Int. Cl.$^7$ ............................................. A21C 11/00
(52) U.S. Cl. .................... 425/403; 425/328; 426/496
(58) Field of Search ............................... 425/328, 383, 425/394, 403; 426/496

(56) References Cited

U.S. PATENT DOCUMENTS

| 3,716,319 A | | 2/1973 | Norman .................. 425/293 |
| 3,880,069 A | | 4/1975 | Moline .................. 99/483 |
| 4,046,920 A | | 9/1977 | Moline .................. 426/19 |
| 4,500,276 A | | 2/1985 | Cherkasky et al. ......... 425/297 |
| 4,514,088 A | * | 4/1985 | Meynet .................. 366/69 |
| 5,165,942 A | * | 11/1992 | Wadell .................. 425/394 |
| 5,204,125 A | | 4/1993 | Larsen .................. 425/298 |
| 5,468,138 A | * | 11/1995 | Bosse et al. ............. 425/383 |
| 5,547,695 A | | 8/1996 | Ricke et al. ............. 426/796 |

FOREIGN PATENT DOCUMENTS

| DE | 3411 428 | 10/1985 |
| EP | 0 104 742 | 4/1984 |
| EP | 0 104 743 | 4/1984 |
| FR | 2497441 | 7/1982 |
| GB | 2272358 | 5/1994 |

OTHER PUBLICATIONS

Cornell, M. Baking & Snack, "Pie in the Sky", Dec. 1998.
Matz S. A., Equipment for Bakers, Elsevier Science Publishers Ltd 1989.
Confectionery Production p. 385, May 1993.

* cited by examiner

Primary Examiner—Nam Nguyen
Assistant Examiner—Donald Heckenberg
(74) Attorney, Agent, or Firm—Darby & Darby

(57) ABSTRACT

The device is used for rolling an edge of a dough piece. It comprises a first mechanism for making a friction engagement with the edge of the dough piece and a second mechanism for moving the first mechanism inwards relative to the edge of the dough piece so that the edge is forced to roll on itself. For instance, this can be realised by a first plate having a plurality of elongated guiding slots. A plurality of followers are slidably mounted in corresponding slots of the first plate. A dough-engaging finger is connected to each follower. The fingers are located under the first plate and moved relative to the dough piece. The device mechanically rolls the edge or edges of a dough piece to form an elevated peripheral portion that prevents the toppings from falling or flowing out of the dough piece during the preparation or when cooked and served by the customers. It also gives a better appearance to the final products. The device may be used in an industrial food preparation process and replaces the manual forming of the elevated peripheral portion that required a large number of persons. It resolves the problem of having large quality variations from one dough piece to another, since the final result of the manual rolling operation depended in most part on the skills and concentration of each individual.

12 Claims, 8 Drawing Sheets

EDGE ROLLING DEVICE FOR DOUGH PIECES

BACKGROUND

Some industrial preparations of food products include the process of shaping unbaked dough pieces before the subsequent steps of the preparation, typically consisting of garnishing, freezing and packing the products. The dough pieces can also be simply packed as such. They are usually made of bread or flaky type dough and are provided in various sizes, shapes, thicknesses and consistencies. Appropriate apparatuses are used along the processing line to form, knead, roll and cut the dough pieces.

One example of such industrial preparation is the production of pizzas. The dough pieces used for the pizzas are sometimes provided with rolled edge or edges to create an elevated peripheral portion that prevents the toppings from falling or flowing out of the dough piece during the preparation or when cooked and served by the customers. It also gives a better appearance to the final products. However, rolled edge or edges were hitherto difficult to realise on an industrial basis since this operation was done manually and required a large number of persons. Such task is tedious for the workers and costly for the manufacturer. Yet, large quality variations were observed from one dough piece to another since the final result of the manual rolling operation depends in most part on the skills and concentration of each individual.

SUMMARY

The object of the present invention is to provide an apparatus capable of mechanically rolling the edge or edges of a dough piece to form an elevated peripheral portion.

More particularly, the present invention provides a device for rolling an edge of a dough piece that comprises a first mechanism for making a friction engagement with the edge of the dough piece and a second mechanism for moving the first mechanism inwards, relative to the edge of the dough piece so that the edge is forced to roll on itself. For instance, this can be realised by a first plate having a plurality of elongated guiding slots. A plurality of followers are slidably mounted in corresponding slots of the first plate. A dough-engaging finger is connected to each follower. The fingers are located under the first plate and moved relative to the dough piece by a finger moving mechanism.

A detailed description of the present invention will now be given with reference to the appended figures.

IDENTIFICATION OF THE COMPONENTS

Figure 1:
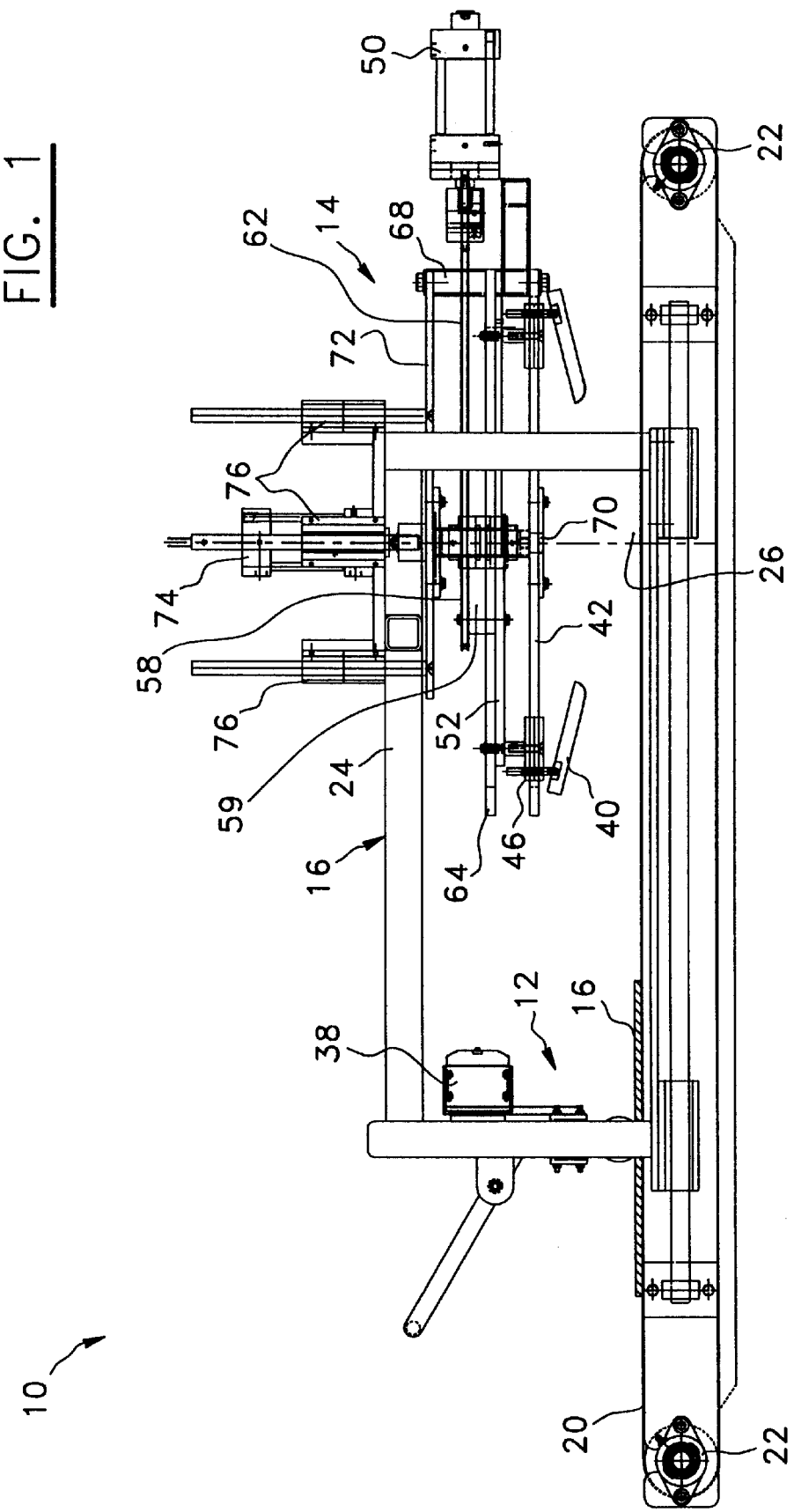
FIG. 1 is a side elevational view of an apparatus featuring a cutting device and an edge rolling device according to a preferred embodiment of the present invention.

The following is a list of the reference numerals, along with the names of the corresponding components, that are used in the appended figures and in the description. It should be noted that the components shown in some figures and that are not referred to correspond to the same components shown in the other figures.

10 apparatus
12 cutting device
14 edge rolling device
16 main frame
18 dough piece
18' excess of dough (after cutting)
20 belt conveyor
22 support rolls (of the belt conveyor)
24 frame section (overlying the conveyor)
26 vertical central axis (of the edge rolling device)
30 knives
32 bearing arm
34 movable subassembly
36 handle
38 motor
39 bracket (for the motor)
40 fingers
41 small slots (at the tip of each finger)
42 first slotted plate
44 radially-extending slots (of the first slotted plate)
45 bearings
46 followers
50 actuator
52 second slotted plate
54 radially-inclined slots (of the second slotted plate)
56 projecting member (of each follower)
58 first sprocket
59 spacer (for the first sprocket)
60 second sprocket
62 chain
63 connector
64 third slotted plate
66 radially-extending slots (of the third slotted plate)
67 central opening (of the third slotted plate)
68 spacers
70 vertical axle 72 upper plate
74 vertical actuator
76 linear bearings

DESCRIPTION

The appended FIGS. 1 to 16 illustrate an apparatus (10) that is an example of a possible embodiment of the present invention. This apparatus (10) is to be installed on a processing line for the industrial preparation of circular dough pieces, such as pizzas. It should be noted that the invention is not limited to the process of circular pizzas and that other kinds and shapes of dough pieces can be processed by simply modifying the design and configuration of the apparatus (10), if necessary.

The illustrated apparatus (10) includes two processing stations, namely a cutting station and an edge rolling station. The optional cutting station comprises a cutting device (12) and the edge rolling station comprises an edge rolling device (14), each capable of being used separately. In the illustrated embodiment, both devices (12,14) are connected to a main frame (16) on which is mounted a conveyor, such as a belt conveyor (20), to convey the dough pieces (18) across the apparatus (10). The conveyor (20) includes all usual associated elements, for example a pair of opposite support rolls (22), a motor (not shown), etc.

In use, the dough piece (18) is first moved by the conveyor (20) to be positioned under the cutting device (12). Once the cutting operation is completed, the conveyor (20) is again activated for positioning the dough piece (18) in registry with the edge rolling device (14). It should be noted that the cutting device (12), the edge rolling device (14), or both of them, can be respectively mounted on a movable carriage (not shown), or supported by another means, synchronised with the conveyor (20) to follow and process a dough piece as it is continuously conveyed. Such processing line can be designed with a plurality of parallel or successive cutting devices (12) and edge rolling devices (14). Other configurations are also possible.

The main frame (16) of the apparatus (10) preferably comprises a section (24) that overlies the conveyor (20). This frame section (24) is made of longitudinal and transversal beams. It is used to support the cutting device (12) and edge rolling device (14). More details about the cutting device (12) and the edge rolling device (14) are given hereinafter.

Cutting Device

Figure 2:
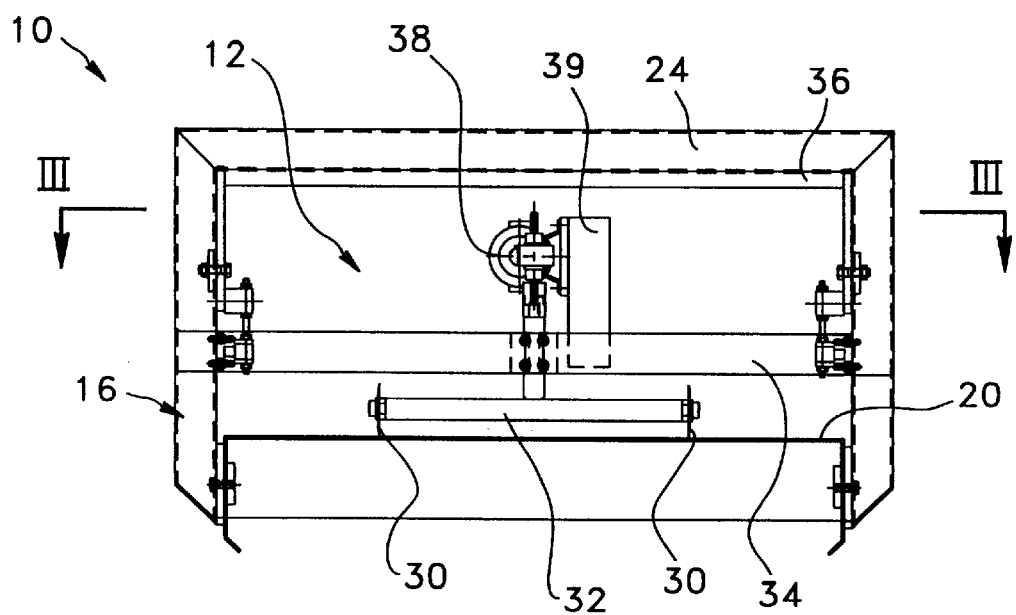
FIG. 2 is a front view of the cutting device of the apparatus of FIG. 1.
Figure 4A:
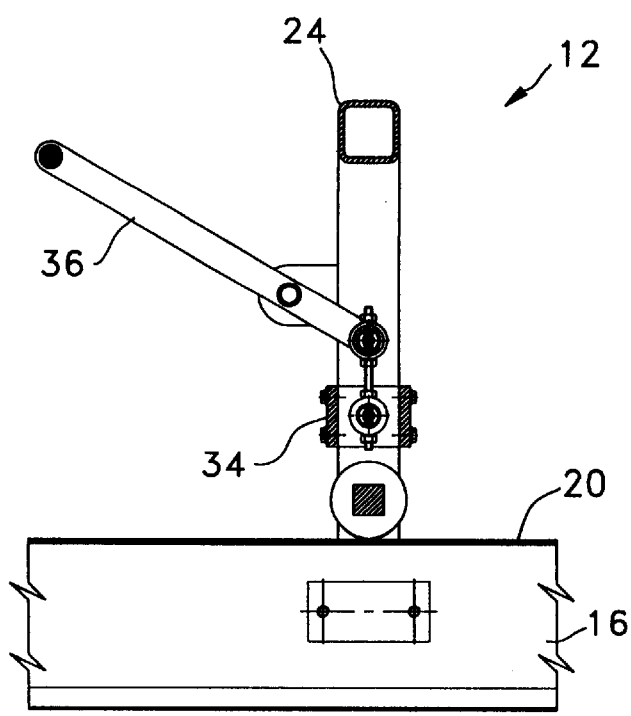
FIGS. 4A and 4B are partial cross-sectional views of the cutting device at two distinct positions, taken along line IV—IV in FIG. 3.
Figure 4B:
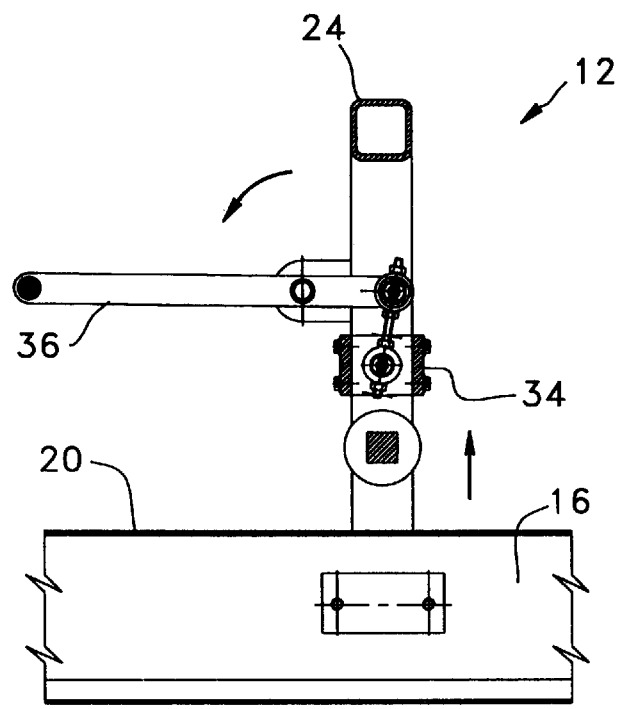
Figure 5:
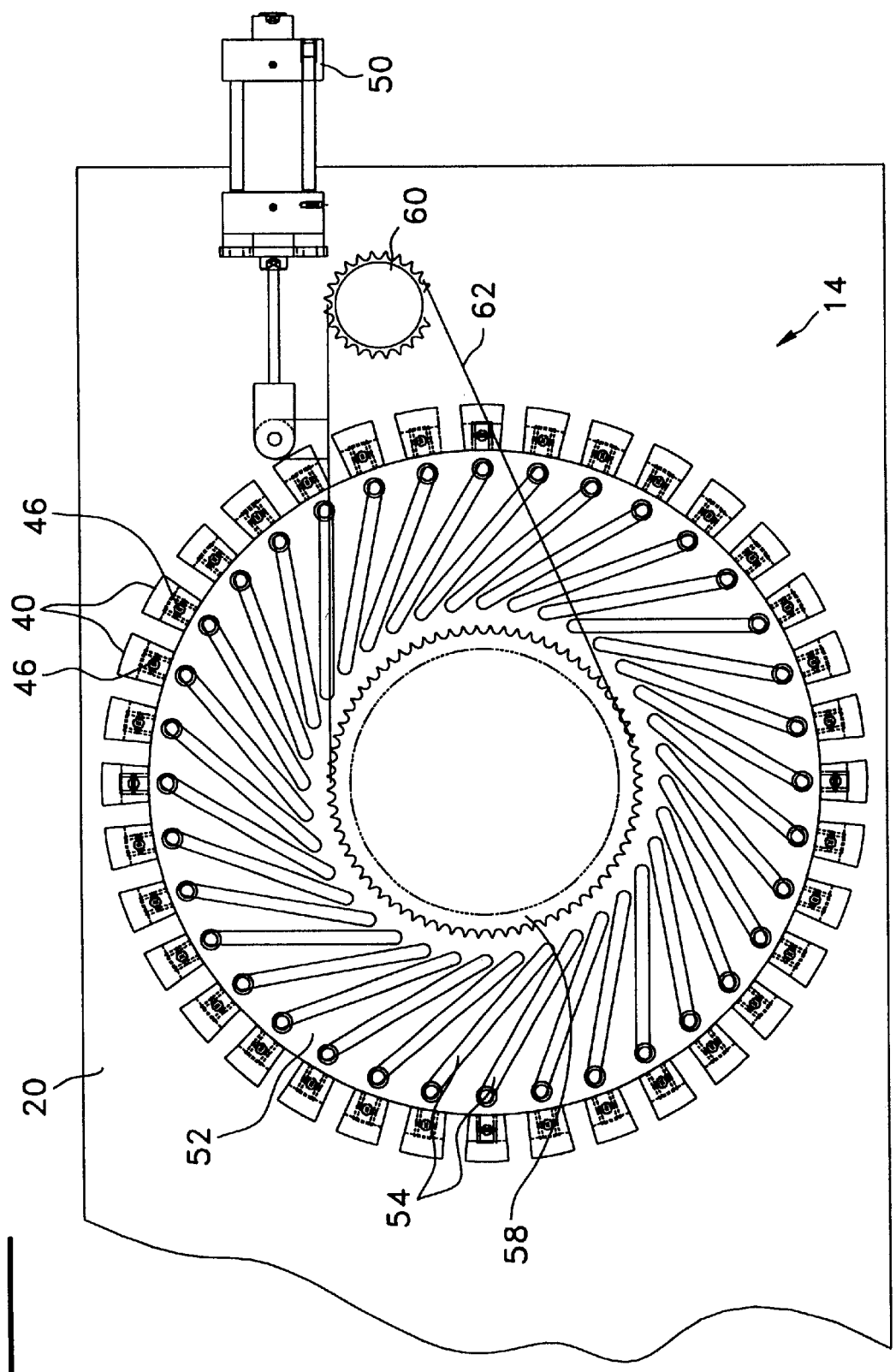
FIG. 5 is a top view of the edge rolling device of the apparatus of FIG. 1.

The illustrated cutting device (12) is used in the process of making circular pizzas. It comprises a pair of thin circular knives (30) rotationally connected at respective ends of a bearing arm (32). The bearing arm (32) is itself pivotally connected to a movable subassembly (34) extending across the width of the frame section (24). The subassembly (34) is provided with a handle (36) for raising and lowering the bearing arm (32) and its knives (30). FIG. 4A shows the movable subassembly (34) in a lowered position and FIG. 4B shows it in a raised position. A motor (38) pivots the bearing arm (32) around a vertical axis when it is lowered by the operator upon displacement of the handle (36). As shown in FIG. 2, the motor (38) is connected to the movable subassembly (34) by means of a bracket (39).

Figure 3:
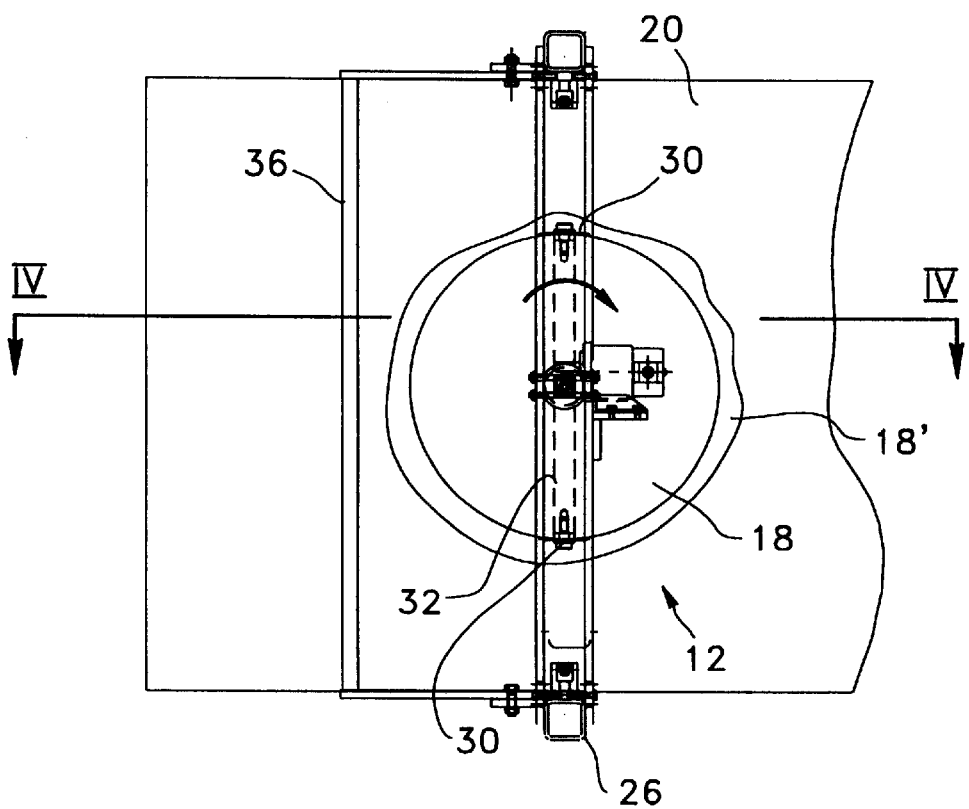
FIG. 3 is a partial top cross-sectional view of the apparatus, taken along line III—III in FIG. 2, showing the operation of the cutting device.

The knives (30) cut the dough piece (18) as they roll over the conveyor (20), as shown in FIG. 3. The cutting of the dough piece (18) is completed when the bearing arm (32) completes a rotation of more than 180°. The excess of dough (18') is removed by hand and by another means and sent back to the dough preparation station.

Alternatively, the cutting device (12) can comprise a movable die (not shown) for stamping out the dough piece (18) and being able to obtain various shapes, such as square, rectangle, triangle, etc. A circular dough piece (18) can also be obtained by stamping. A spring arrangement (not shown) is preferably mounted on the die to allow a perfect cutting by adjusting the blades with reference to the conveyor (20). Moreover, rods (not shown) are mounted in a slightly loose manner on the die to stay in contact with the dough piece while the die is retracted, thus preventing the dough from sticking to the blades of the die.

Edge Rolling Device

The illustrated edge rolling device (14) is preferably divided in three parts, namely fingers (40), which are used for making a friction engagement with the edge of the dough piece (18), the mechanism for moving the fingers (40) inwards relative to the edge of the dough piece (18) and the optional mechanism used to vertically position the fingers (40) with reference to the dough piece (18).

Figure 6:
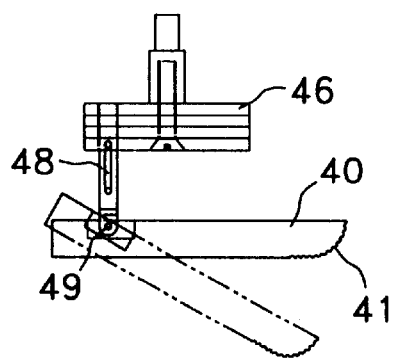
FIG. 6 is an enlarged view of a finger, its follower and the other surrounding parts, used in the edge rolling device of the apparatus of FIG. 1.
Figure 7:
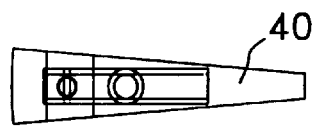
FIG. 7 is a top view of the parts shown in FIG. 6.
Figure 8:
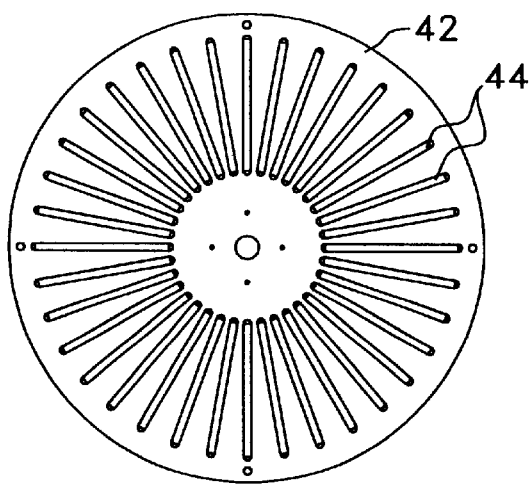
FIG. 8 is a top view of the first slotted plate used in the edge rolling device shown in FIGS. 1 and 5.
Figure 9:
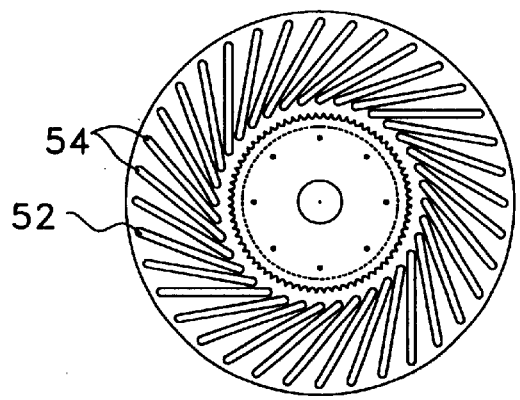
FIG. 9 is a top view of the second slotted plate and its sprocket that are used in the edge rolling device shown in FIGS. 1 and 5.
Figure 10:
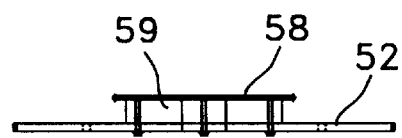
FIG. 10 is a side elevational view of the second slotted plate and the sprocket shown in FIG. 9.
Figure 11:
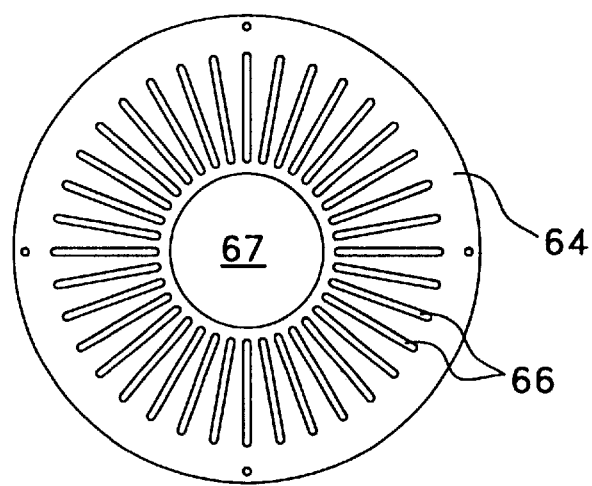
FIG. 11 is a top view of the optional third slotted plate used in the edge rolling device shown in FIGS. 1 and 5.

The fingers (40) are shaped and positioned in accordance with the shape of the dough piece (18). Their number corresponds to the size of the dough piece (18). These fingers (40) simulate the work of the human hand by forcing the edge of the dough piece (18) to roll on itself as the fingers (40) move inwards, i.e. towards the center of the dough piece (18) or in an appropriate direction. In the case of a circular dough piece (18), the fingers (40) are disposed in a circle around a vertical central axis (26) and are radially-oriented. They are simultaneously moved towards the center of the dough piece (18) which had been previously centred with reference to the edge rolling device (14). FIGS. 6 and 7 show an example of a finger (40). It preferably has a tapered shape and a rounded front tip. The front tip further comprises a serrated surface having a plurality of small slots (41), or the like, to increase the contact between the finger (40) and the dough piece (18). Alternatively, the fingers (40) can be provided as one large member in the case of the rolling of a straight edge of a square or triangular dough piece (not shown).

The fingers (40) are connected to the mechanism for moving them in order to achieve the edge rolling operation. The mechanism also repositions them thereafter for the next cycle of edge rolling. The movement of the fingers (40) is essentially parallel to the surface of the dough piece (18). However, the fingers (40) are preferably pivotally connected at or near their end which is opposite the inward tip, thereby allowing a rocking movement of each finger (40) to follow the edge as its height increases. Alternatively, the mechanism used to move the fingers (40) may be designed to move the fingers (40) in a direction which is not strictly parallel to the surface of the dough piece (18).

The mechanism for moving the fingers (40) can have many forms. One of them is illustrated in the figures. It comprises three superimposed slotted plates (42,52,64), two of them being fixed in rotation and the other being pivotable with reference to the other two. The three slotted plates (42,52,64) are preferably circular and coaxial with the vertical central axis (26).

The first slotted plate (42) preferably comprises a plurality of elongated guiding slots (44) disposed radially with reference to the center thereof. These slots (44) are used as guides for followers (46) that are slidably connected therein and to which the fingers (40) are respectively attached. They are preferably straight but can be curved as well. The number of fingers (40), slots (44) and followers (46) is the same, although the number of slots (44) could be greater. As shown in FIG. 6, each finger (40) is preferably connected to the corresponding follower (46) by means of a vertical rod (48) provided with a bottom swivel (49).

The fingers (40) are moved by displacing the followers (46) in their respective slot (44). This can be done by the direct action of an actuator (not shown), such as in the case of a linear movement, or by the indirect action of an actuator (50) with the use of an intermediary linking assembly. This linking assembly is preferably constituted by the second slotted plate (52) that is pivotally connected with reference to the first slotted plate (42). The second slotted plate (52) is parallel to the first slotted plate (42) and located above it, although it would have been possible to position it under the first slotted plate (42). Bearings (45) are used to support the second slotted plate (52) for rotation with reference to the first slotted plate (42). The second slotted plate (52) comprises a plurality of radially-inclined slots (54). These slots (54) are said to be radially-inclined since they define an angle with reference to the radial direction. These slots (54) correspond in number to the number of followers (46). Each follower (46) then comprises a member (56) projecting towards a corresponding slot (54) and which is engaged therein.

As aforesaid, the second slotted plate (52) is pivoted by the actuator (50). Although the illustrated actuator (50) is a linear pneumatic actuator, the second slotted plate (52) can be pivoted by a rotary actuator (not shown) or any other kind of actuator. In the present case, the mechanical link between the second slotted plate (52) and the actuator (50) is achieved by a chain and sprocket arrangement, preferably consisting of a pair of sprockets (58,60), a roller chain (62) and a connector (63) to attach the free end of the actuator (50) to the chain (62). A pair of pulleys and a belt (not shown) would have been a suitable alternative. The first sprocket (58) is coupled to the second slotted plate (52) by means of a bolted spacer (59) and the second sprocket (60) is pivotally connected to another element of the device (14). One may also install a servomotor directly connected to the second plate (52) to rotate that second plate (52).

Optionally, the members (56) projecting from the followers (46) extend to the third slotted plate (64), which comprises a plurality of radially-extending slots (66). The third slotted plate (64) is substantially identical to and in registry with the first slotted plate (40), with the exception of a large central opening (67) through which the spacer (59) of the second slotted plate (52) is located. The third slotted plate (64) adds to the stability of the followers (46). The third slotted plate (64) is rigidly attached to the first slotted plate (40) by means of spacers (68). They then constitute a portion of a frame that bears the other parts of the device (14). This frame, and the other parts, are also preferably movable vertically to give a suitable clearance to the dough piece (18) when moving to or away of the area under the edge rolling device (14). The frame comprises a central vertical axle (70) and an upper plate (72). The axle (70) is selectively lifted or lowered by means of a vertical pneumatic actuator (74). The actuator (74) could be a servojack to precisely adjust the height of the edge rolling device (14). Another kind of actuator or a differently positioned actuator is also possible. Preferably, linear bearings (76) are provided to keep the movement of the frame in a straight line. Alternatively, it is possible to have a fixed frame and moving the conveyor (20) up and down.

Figure 12:
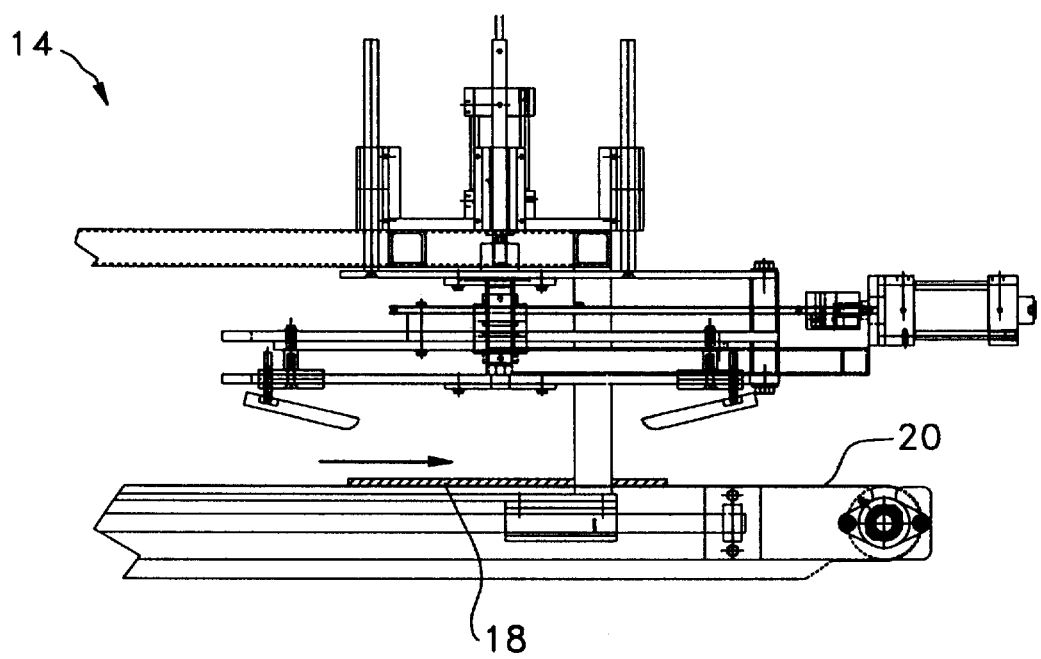
FIG. 12 is a side elevational view of the edge rolling device of FIGS. 1 and 5, showing a first step of a typical edge rolling process for a circular dough piece.

The various steps of operation of the illustrated apparatus (10) are as follows. First, as shown in FIG. 12, the circular dough piece (18) is positioned under the edge rolling device (14). The fingers (40) are positioned at the maximum diameter.

Figure 13:
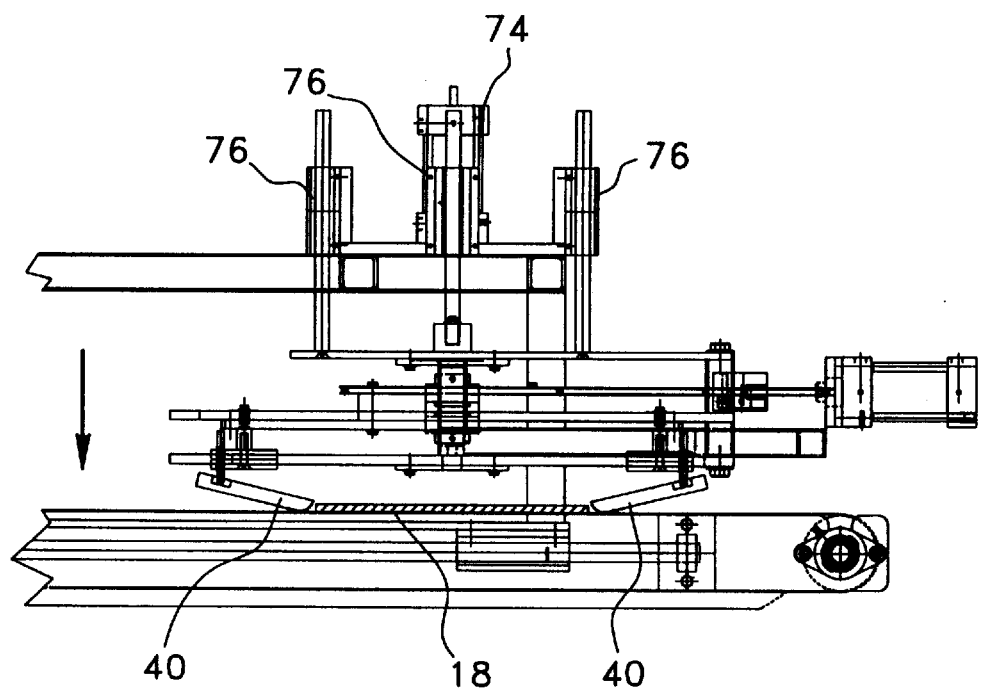
FIG. 13 is a side elevational view similar to FIG. 12, showing a second step of the edge rolling process.
Figure 14:
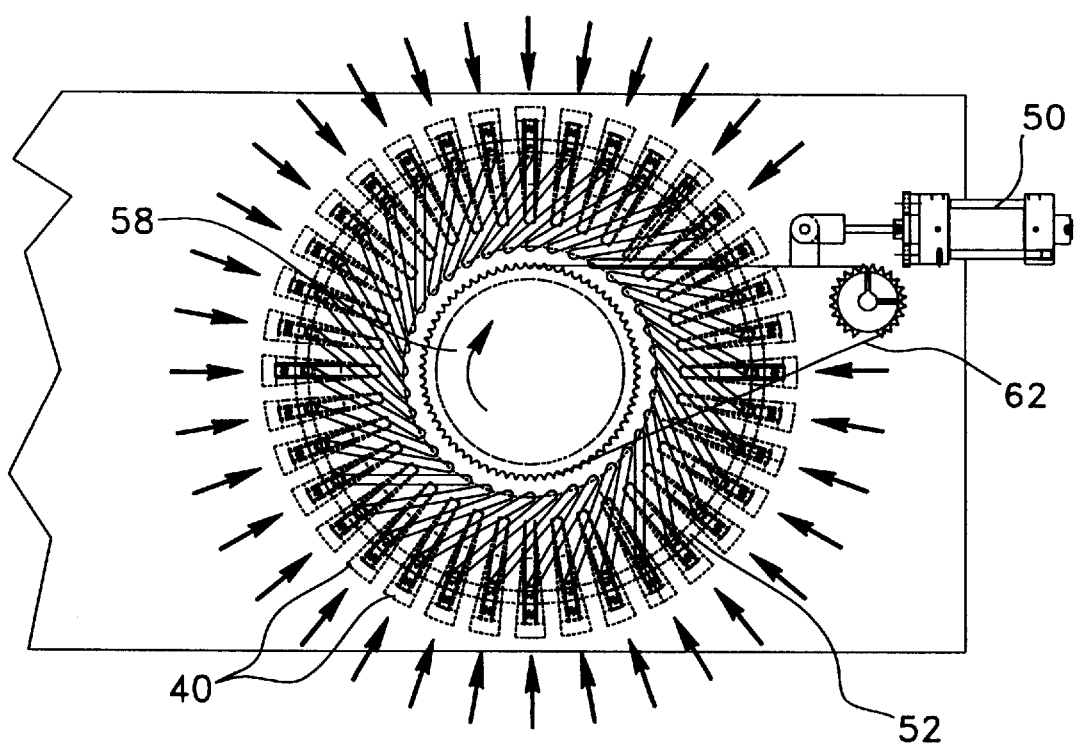
FIG. 14 is a top view of the edge rolling device of FIGS. 12 and 13, showing a third step of the edge rolling process.
Figure 15:
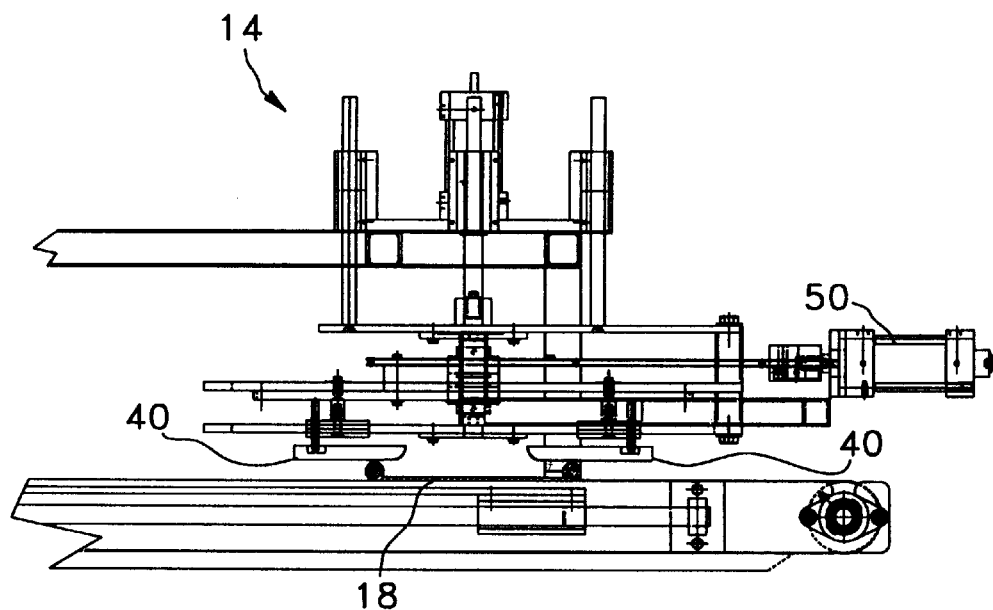
FIG. 15 is a side elevational view similar to FIGS. 12 and 13, showing a fourth step of the edge rolling process.
Figure 16:
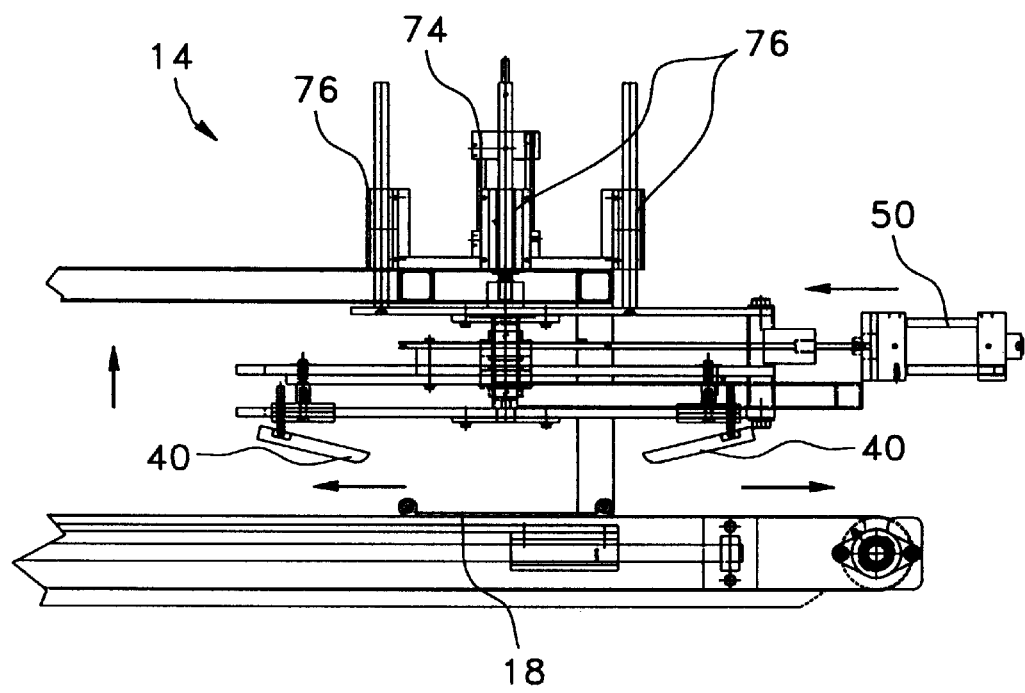
FIG. 16 is a side elevational view similar to FIGS. 12, 13 and 15, showing a fifth step of the edge rolling process.

In FIG. 13, the subassembly is lowered until the fingers (40) are in position with reference to the dough piece (18). In FIG. 14, the actuator (50) is then activated to pilot the second slotted plate (62) in the direction of the arrow. This forces the projecting members (56) of the followers (46) to move inwards. The fingers (40) than move towards the center of the dough piece (18). The tip of the fingers (40) eventually reaches the edge of the dough piece (18) and starts the rolling process as shown in FIG. 15. Because all fingers (40) work together the edge is formed in a substantially uniform and symmetrical manner. Once the rolling is completed, as shown in FIG. 16, the subassembly is lifted and the fingers (40) are repositioned foe the next cycle. The conveyor (20) is activated and moves the processed dough piece (18) towards the subsequent stations.

Although the present invention has been described in detail herein and illustrated in the accompanying figures, it is to be understood that it is not strictly limited towhat is in the description and the figures. Various changes and modifications may be effected without departing from the scope or spirit of the present invention.

What is claimed is:

1. A device for rolling an edge of a dough piece comprising
   a first means comprising a plurality of dough engaging fingers for making a friction engagement with the edge of the dough piece; and
   a second means for moving the first means inwards relative to the edge of the
   dough piece so that the edge is forced to roll on itself comprising
      a) a third means for guiding each finger with reference to the dough piece comprising i) a plate having a plurality of elongated guiding slots, and ii) a plurality of followers to which the fingers are respectively connected, each follower corresponding to one of the guiding slots and being slidably mounted therein, and
      b) a fourth means for reciprocally moving the fingers.

2. A device according to claim 1, wherein the guiding slots are radially disposed with reference to a vertical central axis.

3. A device according to claim 2, wherein the fourth means comprises
   a second plate parallel to the other plate, the second plate being supported for rotation with reference to the vertical central axis and having a plurality of elongated and radially-inclined slots;
   a fifth means for slidably connecting each follower in a respective radially-inclined slot; and
   a sixth means for pivoting the second plate.

4. A device according to claim 3, wherein the fifth means comprises a plurality of members, each projecting from a respective follower towards a corresponding radially-inclined slot of the second plate.

5. A device according to claim 3, wherein the sixth means comprises an actuator.

6. A device according to claim 3, wherein the actuator is a linear pneumatic actuator connected to the second plate by means of a chain and sprocket arrangement.

7. A device according to claim 1, further comprising a means for vertically positioning the first means with reference to the dough piece.

8. A device for rolling an edge of a dough piece comprising at least two dough engaging fingers, and a finger moving mechanism to move each of said at least two dough engaging fingers inwards relative to the edge of the dough piece comprising a first plate having at least two elongated guiding slots and at least two followers, each slidably mounted in a corresponding slot of the first plate and to which the fingers are respectively connected.

9. A device according to claim 8, wherein the guiding slots and the fingers are radially-oriented with reference to a vertical central axis to process a circular dough piece.

10. A device according to claim 9, wherein the finger moving mechanism comprises a second plate parallel to the first plate and coaxial with the vertical central axis, the second plate being supported for rotation with reference to the first plate, the second plate having a plurality of radially-inclined slots; and an actuator connected to the second plate;

wherein each follower comprises a member projecting towards a corresponding radially-inclined slot of the second plate and slidably engaged therein.

11. A device according to claim 10, wherein the fingers are pivotally connected to their respective follower.

12. A device according to claim 8, further comprising a vertical actuator to vertically position the finger with reference to the dough piece.

* * * * *